United States Patent
Wang et al.

(10) Patent No.: US 10,766,095 B2
(45) Date of Patent: Sep. 8, 2020

(54) MATING ELECTRODES FOR RESISTANCE SPOT WELDING OF ALUMINUM WORKPIECES TO STEEL WORKPIECES

(71) Applicant: GM GLOBAL TECHNOLOGY OPERATIONS LLC, Detroit, MI (US)

(72) Inventors: Hui-Ping Wang, Troy, MI (US); Blair E. Carlson, Ann Arbor, MI (US); David R. Sigler, Shelby Township, MI (US); Michael J. Karagoulis, Okemos, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 595 days.

(21) Appl. No.: 15/442,155

(22) Filed: Feb. 24, 2017

(65) Prior Publication Data
US 2017/0252853 A1 Sep. 7, 2017

Related U.S. Application Data

(60) Provisional application No. 62/301,690, filed on Mar. 1, 2016.

(51) Int. Cl.
*B23K 11/20* (2006.01)
*B23K 11/11* (2006.01)
(Continued)

(52) U.S. Cl.
CPC ............. *B23K 11/20* (2013.01); *B23K 11/115* (2013.01); *B23K 11/163* (2013.01);
(Continued)

(58) Field of Classification Search
CPC ..... B23K 11/115; B23K 11/163; B23K 11/20; B23K 11/3009; B23K 2101/34; B23K 2103/20
(Continued)

(56) References Cited

U.S. PATENT DOCUMENTS

| 5,783,794 A | 7/1998 | Oikawa et al. |
| 6,037,559 A | 3/2000 | Okabe et al. |

(Continued)

FOREIGN PATENT DOCUMENTS

| JP | 11342477 | * 12/1999 |
| JP | 2015093283 A | 5/2015 |

OTHER PUBLICATIONS

Wang et al., "Interface microstructure and weld strength of steel/aluminum alloy joints by resistance spot welding," Applied Mechanics and Materials, vols. 117-119 (2012) pp. 1895-1899.

(Continued)

*Primary Examiner* — Dana Ross
*Assistant Examiner* — Joseph W Iskra
(74) *Attorney, Agent, or Firm* — Reising Ethington P.C.

(57) ABSTRACT

A spot weld may be formed between an aluminum workpiece and an adjacent overlapping steel workpiece with the use of opposed spot welding electrodes that have mating weld faces designed for engagement with the outer surfaces of the workpiece stack-up assembly. The electrode that engages the stack-up assembly proximate the aluminum workpiece includes a central ascending convex surface and the electrode that engages the stack-up assembly proximate the steel workpiece has an annular surface. The mating weld faces of the first and second spot welding electrodes distribute the passing electrical current along a radially outwardly expanding flow path to provide a more uniform temperature distribution over the intended spot weld interface and may also produce a deformed bonding interface within the formed weld joint. Each of these events can beneficially affect the strength of the weld joint.

18 Claims, 2 Drawing Sheets

(51) Int. Cl.
  *B23K 11/16* (2006.01)
  *B23K 11/30* (2006.01)
  *B23K 103/20* (2006.01)
  *B23K 101/34* (2006.01)
(52) U.S. Cl.
  CPC ...... *B23K 11/3009* (2013.01); *B23K 2101/34* (2018.08); *B23K 2103/20* (2018.08)
(58) Field of Classification Search
  USPC ...................................................... 219/91.23
  See application file for complete search history.

(56) References Cited

U.S. PATENT DOCUMENTS

| | | |
|---|---|---|
| 7,850,059 B2 | 12/2010 | Kobayashi et al. |
| 7,935,908 B2 | 5/2011 | Nakagawa et al. |
| 7,951,465 B2 | 5/2011 | Urushihara et al. |
| 7,984,840 B2 | 7/2011 | Kobayashi et al. |
| 8,020,749 B2 | 9/2011 | Kobayashi et al. |
| 8,058,584 B2 | 11/2011 | Miyamoto et al. |
| 8,487,206 B2 | 7/2013 | Urushihara et al. |
| 2005/0247679 A1 | 11/2005 | Wang |
| 2006/0081563 A1* | 4/2006 | Ueda ............... B23K 11/30 219/119 |
| 2009/0218323 A1* | 9/2009 | Abe ................. B23K 11/258 219/86.25 |
| 2009/0255908 A1 | 10/2009 | Sigler et al. |
| 2011/0094999 A1* | 4/2011 | Schroth ............ B23K 11/115 219/117.1 |
| 2013/0189023 A1 | 7/2013 | Spinella |
| 2013/0263638 A1 | 10/2013 | Gugel et al. |
| 2014/0360986 A1* | 12/2014 | Sigler ............... B23K 11/115 219/91.2 |
| 2015/0053654 A1 | 2/2015 | Sigler et al. |
| 2015/0053655 A1 | 2/2015 | Sigler et al. |
| 2015/0083693 A1 | 3/2015 | Schroth et al. |
| 2015/0096961 A1 | 4/2015 | Carlson et al. |
| 2015/0096962 A1 | 4/2015 | Sigler et al. |
| 2015/0231729 A1* | 8/2015 | Yang ............... B23K 35/0261 219/119 |
| 2015/0231730 A1* | 8/2015 | Yang ............... B23K 11/14 219/118 |
| 2015/0352658 A1 | 12/2015 | Yang et al. |
| 2015/0352659 A1 | 12/2015 | Sigler et al. |
| 2016/0016252 A1 | 1/2016 | Edwards, II |
| 2016/0045978 A1* | 2/2016 | Wang ............... B23K 11/115 219/91.2 |
| 2016/0158874 A1 | 6/2016 | Wang et al. |
| 2016/0288242 A1 | 10/2016 | Sigler et al. |
| 2016/0346865 A1 | 12/2016 | Sigler et al. |
| 2017/0008118 A1 | 1/2017 | Yang et al. |

OTHER PUBLICATIONS

Zhang et al., "Effects of resistance spot welding parameters on microstructures and mechanical properties of dissimilar material joints of galvanised high strength steel and aluminum alloy," Science and Technology of Welding Journal, vol. 16 (2011) No. 2 pp. 153-161.

Weihua et al., "Microstructure and mechanical property of resistance spot welded joint of aluminum alloy to high strength steel with especial electrodes," China Welding, vol. 20 (2011) No. 2 pp. 1-6.

Weihua et al., "Interfacial characterization of resistance spot welded joint of steel and aluminum alloy," China Welding, vol. 19 (2010) No. 4 pp. 6-10.

Zhang et al., "Characterization of Intermetallic Compounds in Dissimilar Material Resistance Spot Welded Joint of High Strength Steel and Aluminum Alloy," ISIJ International, vol. 51 (2011) No. 11 pp. 1870-1877.

Choi et al., "A Hybrid Joining Technology for Aluminum/Zinc Coated Steels in Vehicles," J. Mater. Sci. Technol., 2010, 26(9), pp. 858-864.

Hwang et al., "Dissimilar Metal Welding of Steel to Al—Mg Alloy by Spot Resistance Welding," Advanced Materials Research, vols. 15-17 (2007) pp. 381-386.

Imaizumi et al., "Joining Aluminum Automotive Body Alloys to Mild Steel by Resistance Spot Welding," Journal of the Japan Light Metal Welding and Construction Association, vol. 17 (1979) No. 1 pp. 10-17.

Miyamoto et al., "Dissimilar Joining of Aluminum Alloy and Steel by Resistance Spot Welding," SAE Int. J. Mater. Manuf., vol. 2 (2009) Issue 1 pp. 58-67.

Mortazavi et al., "Investigation on Joint Strength of Dissimilar Resistance Spot welds of Aluminum Alloy and Low Carbon Steel," Advanced Materials Research, vols. 264-265 (2011) pp. 384-389.

Qiu et al., "Resistance Spot Welding between Aluminum Alloy and Low-Carbon Steel," Advanced Materials Research, vols. 189-193 (2011) pp. 3534-3540.

Qui et al., "Interfacial microstructure and strength of steel/aluminum alloy joints welded by resistance spot welding with cover plate," Journal of Materials Processing Technology, 209 (2009) pp. 4186-4193.

Ueda et al., "Effects of Zn-Based Alloys Coating on Mechanical Properties and Interfacial Microstructures of Steel/Aluminum Alloy Dissimilar Metals Joints Using Resistance Spot Welding," Materials Transactions, vol. 52 (2011) No. 5 pp. 967-973.

Sigler et al., U.S. Appl. No. 14/883,249 entitled "Multi-State Resistance Spot Welding Method for Workpiece Stack-Up Having Adjacent Steel and Aluminum Workpieces," filed Oct. 14, 2015.

Yang et al., U.S. Appl. No. 14/962,866 entitled "Welding Electrode for Use in Resistance Spot Welding Workpiece Stack-Ups that Include an Aluminum Workpiece and a Steel Workpiece," filed Dec. 8, 2015.

Sigler et al., U.S. Appl. No. 15/097,821 entitled "Resistance Spot Welding Steel and Aluminum Workpieces with Electrode Having Insert," filed Apr. 13, 2016.

Sigler et al., U.S. Appl. No. 15/137,778 entitled "External Heat Assisted Welding of Dissimilar Metal Workpieces," filed Apr. 25, 2016.

Sigler et al., U.S. Appl. No. 15/418,768 entitled "Welding Electrode Cutting Tool and Method of Using the Same," filed Jan. 29, 2017.

Sigler et al., U.S. Appl. No. 15/418,771 entitled "Welding Electrode Cutting Tool and Method of Using the Same," filed Jan. 29, 2017.

\* cited by examiner

MATING ELECTRODES FOR RESISTANCE SPOT WELDING OF ALUMINUM WORKPIECES TO STEEL WORKPIECES

CROSS-REFERENCE TO RELATED APPLICATION(S)

This application claims priority to U.S. provisional application No. 62/301,690, which was filed on Mar. 1, 2016. The entire contents of the aforementioned provisional application are incorporated herein in their entirety.

INTRODUCTION

The joining of a steel workpiece to a lighter-weight aluminum workpiece (unalloyed aluminum or an aluminum alloy having 85% by weight or more aluminum) provides a weight reduction, while retaining suitable strength, in many articles of manufacture. The practice offers many weight-saving opportunities such as, for example, in the manufacture of body panels and other body structural members for automotive vehicles. Many such parts have inner and outer panels that are complementarily shaped to provide a stronger more rigid structure as well as to enclose windows, closure members, insulation, electrical wiring, and the like. Such inner and outer panels have thicknesses, for example, from approximately 0.3 mm to 6 mm. The steel and aluminum workpieces are usually shaped with like-shaped peripheral edges or flanges that enable them to be joined with a series of suitably spaced resistance spot welds that are strategically located along their peripheries. A curable adhesive may also be applied between the facing surfaces to be joined in the closing of the panel structure to provide further bonding strength.

In the formation of a resistance spot weld, the steel and aluminum workpieces are stacked and fixtured together in face-to-face contact with engaged faying surfaces at each location where a spot weld is to be formed. Two welding electrodes that are arranged in co-linear facial opposition against their respective outer surfaces of the workpiece stack-up assembly then deliver an electric welding current through overlapping and adjacent steel and aluminum workpieces. The passing electrical welding current momentarily forms a molten weld pool within the aluminum workpiece that, in turn, wets the adjacent faying surface of the steel workpiece. The steel workpiece does not melt and contribute to the molten weld pool. After a short period of electrical current flow, typically no longer than a second or two, the electrical welding current is terminated with the opposing electrodes still pressed against their respective workpiece stack-up outer surfaces. The steel and aluminum workpieces cool in the ambient environment—although differences in the thermal conductivities of the two materials causes heat to disseminate differently through the workpieces from the weld location—and the molten weld pool solidifies in the aluminum workpiece to form a weld joint bonded to the steel workpiece. The weld joint includes a weld nugget and, typically, a brittle intermetallic layer between the weld nugget and the steel workpiece. The intermetallic layer may include various Fe—Al intermetallic compounds.

While joining an aluminum workpiece with a complementary steel workpiece can reduce the weight of a part being manufactured, the formation of one or more electrical resistance spot welds at the steel-to-aluminum faying interface is a challenging endeavor due to several factors that can be traced to the dissimilar nature of the workpieces. These factors include the presence of a surface oxide layer on the aluminum workpiece, the marked difference in the melting points of the steel and aluminum workpieces (about 1300° C.-1500° C. for steel and about 600° C. for aluminum), the significantly greater thermal and electrical conductivities of the aluminum workpiece compared to the steel workpiece, and the propensity for aluminum and steel to react with each other under intimate contact at elevated temperatures to form a brittle intermetallic layer at the bonding interface of the weld joint and the steel workpiece. The differing characteristics of the steel and aluminum workpieces, more specifically, can lead to the development and dispersal of weld defects at and along the bonding interface of the weld joint and the steel workpiece, which has an adverse effect on the strength of the joint including the strength in peel and cross-tension. The weld defects that are most commonly found in such a disruptive dispersal include surface oxide residues, porosity, microcracks, shrinkage voids, and residues from the thermal decomposition of any leftover adhesive films that remain at the weld location.

SUMMARY

A method of forming a resistance spot weld in a workpiece stack-up assembly that includes a steel workpiece and an adjacent overlapping aluminum workpiece according to one embodiment of the disclosure includes several steps. First, a workpiece stack-up assembly is provided that comprises a steel workpiece and adjacent aluminum workpiece that overlaps with the steel workpiece to establish a faying interface therebetween. The workpiece stack-up assembly has a first outer surface proximate the aluminum workpiece and an opposed second outer surface proximate the steel workpiece. Next, a first spot welding electrode is pressed against the first outer surface of the workpiece stack-up assembly and a second spot welding electrode is pressed against the second outer surface of the assembly. The first spot welding electrode comprises a weld face having a central ascending convex surface that rises above an annular surface that surrounds the central ascending convex surface such that, at least initially, the central ascending convex surface makes contact with the first outer surface of the workpiece stack-up assembly and the surrounding annular surface of the weld face of the first welding electrode does not. The second spot welding electrode comprises a weld face having a central descending concave surface that drops below an annular surface that surrounds the descending concave surface such that, at least initially, the annular surface of the weld face of the second welding electrode makes contact with the second outer surface of the workpiece stack-up assembly and the descending concave surface does not.

The method of this particular embodiment further calls for passing an electrical current between the weld faces of the first and second spot welding electrodes across the faying interface of the steel and aluminum workpieces to cause melting of the aluminum workpiece and the formation of a molten weld pool within the aluminum workpiece that wets an adjacent surface of the steel workpiece. Eventually, after a molten weld pool of the desired size has been formed, the passage of the electrical current between the weld faces of the first and second spot welding electrodes is terminated so that the molten weld pool solidifies into a weld joint that bonds the steel and aluminum workpieces together at the spot weld location. The formed weld joint includes a bonding interface with the adjacent surface of the steel workpiece that is deformed toward the central descending concave surface of the weld face of the second spot welding electrode.

The method according to the aforementioned embodiment may be practiced in a variety of ways. For example, the workpiece stack-up assembly may include only the steel and aluminum workpieces. In that regard, an outer workpiece surface of the aluminum workpiece provides the first outer surface of the workpiece stack-up assembly and an outer workpiece surface of the steel workpiece provides the second outer surface of the workpiece stack-up assembly. As such, the first spot welding electrode is pressed against the outer workpiece surface of the aluminum workpiece and the second spot welding electrode is pressed against the outer workpiece surface of the steel workpiece. In another example, the aluminum workpiece may comprise an aluminum alloy substrate having a surface oxide layer thereon. Still further, the central ascending convex surface of the weld face of the first welding electrode may be a sectional portion of a sphere having a radius of curvature between 50 mm and 5 mm, and the central descending concave surface of the weld face of the second welding electrode may be an intruding depression of a sectional portion of a sphere having a radius of curvature between 50 mm and 5 mm. In other aspects of the method of the aforementioned embodiment, a constant gap equal to an overall thickness of the workpiece stack-up assembly is maintained between the central ascending convex surface and the central descending concave surface during passage of the electrical current between the first and second spot welding electrodes.

In yet other aspects of the method of the aforementioned embodiment, the electrical current passed between the weld face of the first welding electrode and the weld face of the second welding electrode may be distributed along a radially outwardly expanding flow path that extends from the first spot welding electrode to the second spot welding electrode such that a density of the electrical current is higher in the aluminum workpiece at an interface with the central ascending convex surface than in the steel workpiece at an interface with the annular surface. What is more, during the passage of electrical current flow, the annular surface of the weld face of the first welding electrode may come into contact with the first outer surface of the workpiece stack-up assembly, thereby causing the radially outwardly expanding flow path of the electrical current to cease to exist.

A method of forming a resistance spot weld in a workpiece stack-up assembly that includes a steel workpiece and an adjacent overlapping aluminum workpiece according to another embodiment of the disclosure includes several steps. First, a central ascending convex surface of a weld face of a first spot welding electrode is pressed against a first outer surface of the workpiece stack-up assembly that includes a steel workpiece and an adjacent aluminum workpiece that overlaps with the steel workpiece. At the same time, an annular surface of a weld face of a second spot welding electrode is pressed against a second outer surface of the workpiece stack-up assembly that is opposed to the first outer surface. The first outer surface of the workpiece stack-up assembly is proximate the aluminum workpiece and the second outer surface of the workpiece stack-up assembly is proximate the steel workpiece. A resistance spot weld that bonds together the steel and aluminum workpiece is formed by passing an electrical current between the central ascending convex surface of the weld face of the first spot welding electrode and the annular surface of the weld face of the second spot welding electrode so that the electrical current passed between the weld face of the first welding electrode and the weld face of the second welding electrode is distributed along a radially outwardly expanding flow path that extends from the first spot welding electrode to the second spot welding electrode such that a density of the electrical current is higher in the aluminum workpiece at an interface with the central ascending convex surface than in the steel workpiece at an interface with the annular surface.

The method according to the aforementioned embodiment may be practiced in a variety of ways. For instance, the spot weld may be comprised of a weld joint contained entirely within the aluminum workpiece that includes a bonding interface with an adjacent surface of the steel workpiece that is deformed toward the second spot welding electrode. As another example, the weld face of the first spot welding electrode may further include an annular surface that surrounds the central ascending convex surface. And the central ascending convex surface of the weld face of the first welding electrode may be a sectional portion of a sphere having a radius of curvature between 50 mm and 5 mm. Still further, the weld face of the second spot welding electrode may further include a central descending concave surface that is surrounded by the annular surface. The central descending concave surface of the weld face of the second welding electrode may be an intruding depression of a sectional portion of a sphere having a radius of curvature between 50 mm and 5 mm.

In other aspects of the method of the aforementioned embodiment, the workpiece stack-up assembly may include only the steel and aluminum workpieces. In that regard, an outer workpiece surface of the aluminum workpiece provides the first outer surface of the workpiece stack-up assembly and an outer workpiece surface of the steel workpiece provides the second outer surface of the workpiece stack-up assembly. As such, the first spot welding electrode is pressed against the outer workpiece surface of the aluminum workpiece and the second spot welding electrode is pressed against the outer workpiece surface of the steel workpiece.

In yet other aspects of the method of the aforementioned embodiment, the weld face of the first spot welding electrode may comprise an annular surface that surrounds the central ascending convex surface such that the central ascending convex surface rises above the annular surface of the weld face of the first spot welding electrode, and the weld face of the second spot welding electrode may comprise a central descending concave surface that is surrounded by the annular surface of the weld face of the second spot welding electrode. Additionally, during current flow, the annular surface of the weld face of the first welding electrode may come into contact with the first outer surface of the workpiece stack-up assembly, thereby causing the radially outwardly expanding flow path of the electrical current to cease to exist. In still other aspects of the method of the aforementioned embodiment, a constant gap equal to an overall thickness of the workpiece stack-up assembly is maintained between the central ascending convex surface and the central descending concave surface during passage of the electrical current between the first and second spot welding electrodes.

DETAILED DESCRIPTION

The present disclosure pertains to the design of opposing spot welding electrodes for use in forming resistance spot welds between an aluminum workpiece and a steel workpiece that are located adjacent to one another in a workpiece stack-up assembly. The spot welding electrodes used to form spot welds between an aluminum workpiece and a steel workpiece include mating weld faces. Specifically, one electrode has a weld face with a convex central portion for engagement with an outer surface of the stack-up assembly proximate the aluminum workpiece and the other, opposing electrode has a weld face with a complementarily shaped and sized concave central portion for engagement with the opposing outer surface of the stack-up assembly proximate the steel workpiece. The combination of the spot welding electrodes with their mating weld faces distributes the electrical current passing between the facing weld faces along a radially outwardly expanding flow path that extends from the electrode proximate the aluminum workpiece to the electrode in proximate the steel workpiece. The spot welds formed by the aforementioned spot welding electrodes are characterized by stronger, more peel- and cross-tension resistant weld joints that include deformed non-planar (out of surface plane) bonding interfaces (e.g., curved or angular) with their adjacent steel workpiece faying surfaces and thinner intermetallic layer at the spot weld location depending on the implemented mating geometries of the opposed weld faces.

The mating weld faces of the opposed cooperating spot welding electrodes described herein have been modified specifically to accommodate the practice of resistance spot welding overlapping and adjacent steel and aluminum workpieces despite the confluence of complicating considerations that accompany the spot welding of dissimilar metal materials. As discussed above, the formation of good quality resistance spot welds on a consistent basis between an aluminum workpiece and a steel workpiece is not a simple task that can be resolved merely by adopting legacy spot welding techniques developed in the past for similarly-composed (e.g., steel-to-steel or aluminum-to-aluminum) workpieces. To be sure, the spot welding of an aluminum workpiece and a steel workpiece invokes a multitude of issues that must be dealt with including, for instance, the diverse compositions of aluminum and steel, the markedly different physical properties of aluminum and steel including their melting points and thermal and electrical conductivities, and the presence of a mechanically tough and electrically insulating surface oxide layer on the aluminum workpiece, or else the strength and other mechanical properties of the obtained weld joint that constitutes the spot weld may suffer.

Figure 1:
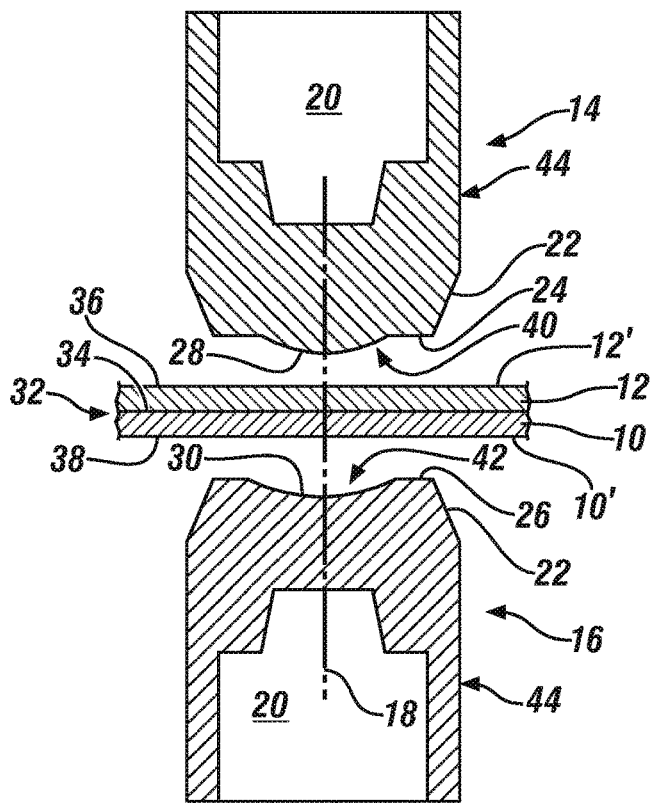
FIG. 1 is an enlarged schematic side view, in cross-section, of a workpiece stack-up assembly that includes of an aluminum workpiece on top of a steel workpiece with an upper first spot welding electrode, which has a weld face with a central ascending convex surface and a surrounding annular surface, positioned for engagement with the stack-up assembly proximate the aluminum workpiece, and a lower second spot welding electrode, which has a weld face with a central descending concave surface and a surrounding annular surface, positioned for engagement with the stack-up assembly proximate the steel workpiece.
Figure 2:
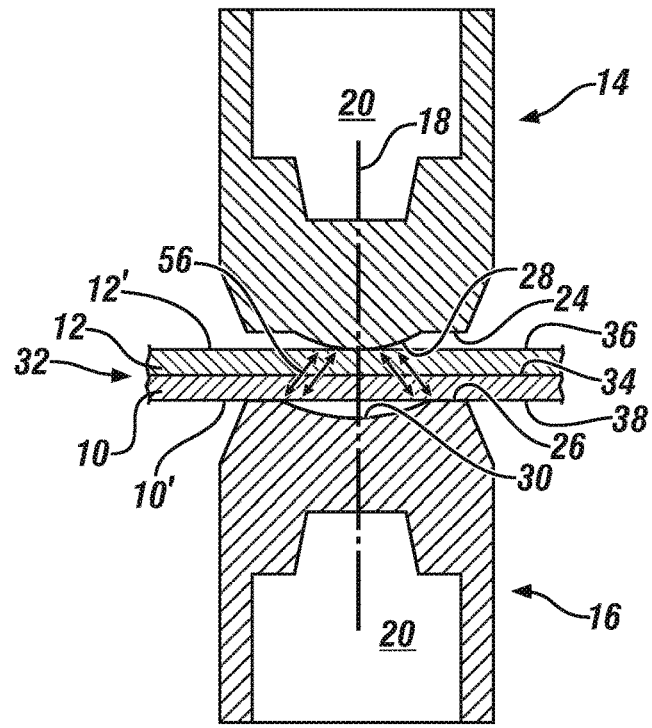
FIG. 2 is an enlarged schematic side view, in cross section, of the spot welding electrodes and the workpiece stack-up assembly of FIG. 1 in which the electrodes have been pressed into initial engagement with opposed outer surfaces of the workpiece stack-up assembly according to one embodiment of the disclosure, and an electrical current is being passed between the opposing spot welding electrodes through the workpieces at a spot weld location.
Figure 3:
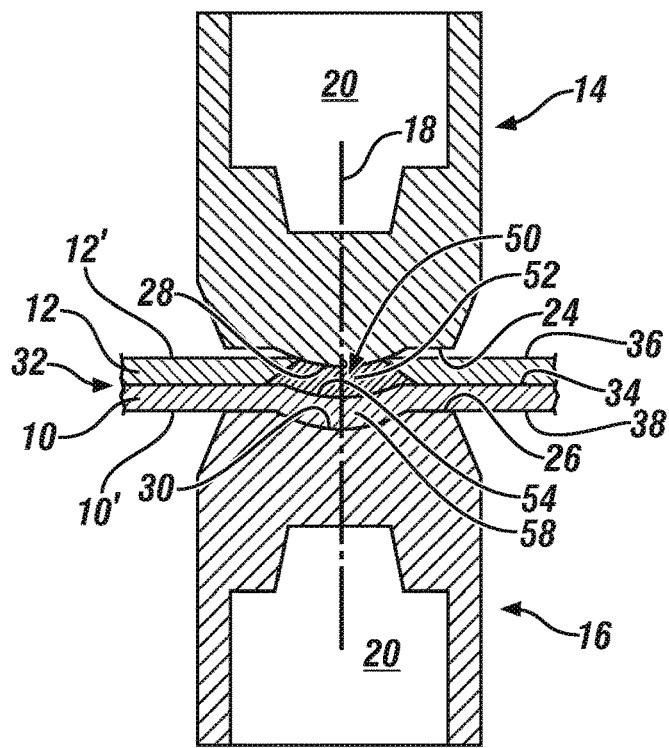
FIG. 3 is an enlarged schematic side view, in cross section, of the spot welding electrodes and the workpiece stack-up shown in FIGS. 1-2 in which a spot weld comprised of a weld joint contained entirely within the aluminum workpiece has been formed at the spot weld location by momentarily passing the electrical current between the opposing spot weld electrodes and through the workpiece stack-up.

Referring now to FIGS. 1-3, the spot welding electrodes with mating weld faces and a method of using those spot welding electrodes are described. In the enlarged schematic view of FIG. 1, a workpiece stack-up assembly 32 is illustrated that includes a portion of a steel workpiece 10 and an adjacent overlapping portion of an aluminum workpiece 12. The assembled steel and aluminum workpieces 10, 12 may, for example, be portions, respectively, of an aluminum outer body side panel and a steel inner body side panel for an automotive vehicle. Each panel may have been previously shaped. The steel and aluminum workpieces 10, 12 make interfacial contact at a faying interface 34 that extends through a spot weld location where joining is desired. The contact experienced between the workpieces 10, 12 at their faying interface 34 may be direct contact or indirect contact such as, for example, when a weld through adhesive or sealer or other thin intermediary material is present. The illustrated portions of the workpieces may, for example, be at the periphery of the stack-up assembly 32 where a series of resistance spot welds are to be formed in spaced-apart alignment along the peripheral edges.

The steel workpiece 10 includes a steel substrate from any of a wide variety of strengths and grades that is either coated or uncoated. The steel substrate may be hot-rolled or cold-rolled and may be composed of steel such as mild steel, interstitial-free steel, bake-hardenable steel, high-strength low-alloy (HSLA) steel, dual-phase (DP) steel, complex-phase (CP) steel, martensitic (MART) steel, transformation induced plasticity (TRIP) steel, twining induced plasticity (TWIP) steel, and boron steel such as when the steel workpiece 10 includes press-hardened steel (PHS). If coated, the steel substrate preferably includes a surface layer of zinc (galvanized), a zinc-iron alloy (galvanneal), a zinc-nickel alloy, nickel, aluminum, an aluminum-magnesium alloy, an aluminum-zinc alloy, or an aluminum-silicon alloy, any of which may have a thickness of up to 50 μm and may be present on each side of the steel substrate. Taking into account the thickness of the steel substrate and any optional surface layer that may be present, the steel workpiece 10 may have a thickness that ranges from 0.3 mm and 6.0 mm, or more narrowly from 0.6 mm to 2.5 mm, at least at the spot weld location.

The aluminum workpiece 12 includes an aluminum substrate that is either coated or uncoated. The aluminum substrate may be composed of unalloyed aluminum or an aluminum alloy that includes at least 85 wt % aluminum. Some notable aluminum alloys that may constitute the coated or uncoated aluminum substrate are an aluminum-magnesium alloy, an aluminum-silicon alloy, an aluminum-magnesium-silicon alloy, and an aluminum-zinc alloy. If coated, the aluminum substrate may include a surface layer of a refractory oxide material comprised of aluminum oxide compounds and possibly other oxide compounds as well, such as magnesium oxide compounds if the aluminum substrate is an aluminum-magnesium alloy. The aluminum substrate may also be coated with a layer of zinc, tin, or a metal oxide conversion coating comprised of oxides of titanium, zirconium, chromium, or silicon, as described in US Pat. Pub. No. 2014/0360986. The surface layer may have a thickness ranging from 1 nm to 10 μm and may be present on each side of the aluminum substrate. Taking into account the thickness of the aluminum substrate and any optional surface layer that may be present, the aluminum workpiece 12 may have a thickness that ranges from 0.3 mm to about 6.0 mm, or more narrowly from 0.5 mm to 3.0 mm, at least at the spot weld location.

The aluminum substrate of the aluminum workpiece 12 may be provided in wrought or cast form. For example, the aluminum substrate may be composed of a 4xxx, 5xxx, 6xxx, or 7xxx series wrought aluminum alloy sheet layer, extrusion, forging, or other worked article. Alternatively, the aluminum substrate may be composed of a 4xx.x, 5xx.x, 6xx.x, or 7xx.x series aluminum alloy casting. Some more specific kinds of aluminum alloys that may constitute the aluminum substrate include, but are not limited to, AA5754 and AA5182 aluminum-magnesium alloy, AA6111 and AA6022 aluminum-magnesium-silicon alloy, AA7003 and AA7055 aluminum-zinc alloy, and Al-10Si—Mg aluminum die casting alloy. The aluminum substrate may further be employed in a variety of tempers including annealed (O), strain hardened (H), and solution heat treated (T), if desired.

The workpiece stack-up assembly 32 includes a first outer surface 36 proximate the aluminum workpiece 12 and a second outer surface 38 proximate the steel workpiece 10. The term "proximate" as used in this context means a surface of the actual aluminum or steel workpiece 10, 12 or the surface of a nearby workpiece of the same side of the stack-up assembly 32 as the aluminum or steel workpiece 10, 12. For instance, when only the steel and aluminum workpieces 10, 12 are present in the stack-up assembly 32 (e.g., a "2T" stack-up), as shown here in FIGS. 1-3 for, an outer workpiece surface 12' of the aluminum workpiece 12 provides the first outer surface 36 and an outer workpiece surface 10' of the steel workpiece 10 provides the second outer surface 38. In other embodiments, however, an additional workpiece may be disposed on either or both sides of the adjacent steel and aluminum workpieces 10, 12 so long as the additional workpieces is of the same base metal type as its immediate neighboring steel or aluminum workpiece 10, 12. For example, the workpiece stack-up assembly 32 may include an additional aluminum workpiece disposed adjacent to and covering the outer workpiece surface 12' of the aluminum workpiece 12 that lies adjacent to the steel workpiece 10, and/or it may include an additional steel workpiece disposed adjacent to and covering the outer workpiece surface 10' of the steel workpiece 10 that lies adjacent to the aluminum workpiece 12. When another additional workpiece is present, the first and/or second outer surface 36, 38 of the stack-up assembly 32 may be provided by an additional workpiece.

The fact that the workpiece stack-up assembly 32 may include at least one other additional workpiece besides the adjacent steel and aluminum workpieces 10, 12 which overlap to form the faying interface 34 does not change the basic function of the mating welding electrodes or their effect on a spot weld formed between the adjacent steel and aluminum workpieces 10, 12. In either instance, as will be further explained below, a spot weld that comprises a weld joint contained within the aluminum workpiece 12 is formed by an electrical current delivered between the spot welding electrodes, and the resultant weld joint upon solidification bonds to the adjacent faying surface of the steel workpiece 10. Consequently, the generalized depictions of the workpiece stack-up assembly 32 shown in FIGS. 1-3 are illustrated only with the adjacent steel and aluminum workpieces 10, 12 for simplicity since the bonding action that occurs between those two workpieces 10, 12 is virtually the same regardless if an additional workpiece is disposed next to one or both of the workpieces 10, 12. The structure of the spot welding electrodes and their use in conjunction with the workpiece stack-up assembly 32 is, however, also fully applicable to assemblies that include just the adjacent steel and aluminum workpieces 10, 12 as well as others that include an additional workpiece or workpieces.

In FIG. 1, a first hollowed, cylindrical resistance spot welding electrode 14 is positioned to confront the first outer surface 36 of the stack-up assembly 32 which, as shown, may also be the outer workpiece surface 12' of the aluminum workpiece 12. Additionally, a second hollowed, cylindrical resistance spot weld electrode 16 is positioned to confront the second outer surface 38 of the stack-up assembly 32 which, as shown, may be the outer workpiece surface 10' of the steel workpiece 10. The first resistance spot welding electrode 14 includes a first weld face 40 and the second resistance spot welding electrode 16 includes a second weld face 42. The first and second weld faces 40, 42 of the first and second welding electrodes 14, 16 are aligned on a common central axis 18 that also extends though the center of the intended spot weld location, but is not necessarily in alignment with the bodies of the electrodes 14, 16 as the weld faces 40, 42 may be tilted relative to the body for better accessibility. The body portion 44 of each electrode 14, 16, which may have a diameter between 15 mm and 20 mm, is machined or shaped to form a like hollowed interior 20 for attachment of the electrode 14, 16 to a separate, movable, opposing welding arm (not illustrated) configured to deliver a programmed electrical current between the electrodes 14, 16. A coolant may also be delivered through each welding arm to maintain the attached welding electrode 14, 16 at a suitable temperature. The respective motions of the welding arms are programmed to position the two spot welding electrodes 14, 16 on opposite sides of the workpiece stack-up assembly 30 such that the weld faces 40, 42 are aligned on the common axis 18 for forming a resistance spot weld.

The shapes of the first and second spot welding electrodes 14, 16 differ principally in the design of their weld faces 40, 42. For each of the first and second spot welding electrodes 14, 16, one of its ends is tapered from the outer diameter of the cylindrical body 44 in the shape of a truncated cone 22, or a truncated sphere, with an annular surface (surface 24 on the first welding electrode 14, and surface 26 on the second welding electrode 16) for accommodating a central weld face portion of the electrode 14, 16. In the first spot welding electrode 14, which engages the first outer surface 36 of the workpiece stack-up assembly 32, the weld face 40 has a central ascending convex surface 28 that rises above the annular surface 24 that surrounds and is contiguous with the convex surface 28. The central ascending convex surface 28 may be a sectional portion of a sphere having a radius of curvature between 50 mm and 5 mm and, more narrowly, between 25 mm and 8 mm. The annular surface 24 may be oriented perpendicular to the common axis 18, as shown, or it may be angled relative to the common axis 18. Moreover, the annular surface 26 may be nominally flat (which is a level of planarity that allows for random surface roughening via grit blasting and the like) or it may include more defined surface intrusions or protrusions such as upstanding radially spaced apart upstanding circular ridges. The diameter of the central ascending convex surface 28 at its widest dimension may range from 2 mm to 15 mm, or more narrowly from 3 mm to 10 mm, while the diameter of the entire first weld face 40 as defined by the periphery of the annular surface 24 may range from the 3 mm to 20 mm, or more narrowly from 4 mm to 12 mm.

Conversely, in the second spot welding electrode 16, which engages the second outer surface 38 of the workpiece stack-up assembly 32, the weld face 42 has a central descending concave surface 30 that drops below the annular surface 26 that surrounds and is contiguous with the concave surface 30. The central descending concave surface 30 may be formed as an intruding depression of a sectional portion of a sphere having a radius of curvature that also lies between 50 mm and 5 mm, or more narrowly between 25 mm to 8 mm. The annular surface 26 may be oriented perpendicular to the common axis 18, as shown, or it may be angled relative to the common axis 18. Moreover, the annular surface 26 is preferably nominally flat. The diameter of the central descending concave surface 30 at its widest dimension may range from 2 mm to 15 mm, or more narrowly from 3 mm to 10 mm, while the diameter of the entire second weld face 42 as defined by the periphery of the annular surface 26 may range from 3 mm to 20 mm, or more narrowly from 4 mm to 12 mm. The central descending concave surface 30 of the second weld face 42 and the central ascending convex surface 28 of the first weld face 40 are sized and shaped to have a mating relationship even though the two weld faces 40, 42 do not actually engage each other during resistance spot welding.

The mating relationship between the weld face 40 of the first spot welding electrode 14 and the weld face 42 of the second spot welding electrode 16 may be complimentary in that the central ascending convex surface 28 and the central descending concave surface 30 are matching counterparts such that the convex surface 28 would fit snugly within the concave surface 30 of the central portions of the weld faces 40, 42 were brought together. In another embodiment, the mating relationship between the weld face 40 of the first spot welding electrode 14 and the weld face 42 of the second spot welding electrode 16 may accommodate the overall thickness of the workpiece stack-up assembly 32; that is, the central ascending convex surface 28 and the central descending concave surface 30 are sized such that a constant gap equal to the overall thickness of the stack-up assembly 32 can be maintained between the surfaces 28, 30 during spot welding and, more particularly, during current flow. For example, if the central ascending convex surface 28 and the central descending concave surface 30 are spherically shaped, the difference in the radii of curvature of the two central weld face portions 40, 42 is preferably between 1 mm and 8 mm, but larger or smaller differences can be employed depending on the overall thickness of the stack-up assembly 32. Indeed, if a 1 mm aluminum workpiece is being welded to a 2 mm steel workpiece, thus producing an overall stack-up thickness of 3 mm, then the central ascending convex surface 28 of the weld face 40 of the first spot welding electrode 14 could have a 17 mm radius of curvature while the central descending concave surface 30 of the weld face 42 of the second spot welding electrode 16 could have a 20 mm radius of curvature.

The first and second spot welding electrodes 14, 16 can be formed of any suitable electrically and thermally conductive material. For example, the spot welding electrodes 14, 16 may be constructed from a material having an electrical conductivity of at least 45% IACS and a thermal conductivity of at least 180 W/mK. Some material classes that fit this criterion include a copper alloy and a refractory-based material that includes at least 35 wt %, and preferably at least 50 wt %, of a refractory metal. Specific examples of suitable copper alloy include a C15000 copper-zirconium (CuZr) alloy, a C18200 copper-chromium (CuCr) alloy, and a C18150 copper-chromium-zirconium (CuCrZr) alloy, while the a suitable refractory-based material may include a molybdenum or tungsten particulate phase such as a tungsten-copper metal composite that contains between 50 wt % and 90 wt % of a tungsten particulate phase dispersed in copper matrix that constitutes the balance (between 50 wt % and 10 wt %) of the composite. Other materials not expressly listed here that meet the applicable electrical and thermal conductivity standards may, of course, also be used as well.

Referring now to the cross-sectional views presented in FIGS. 2-3, the use of the first and second spot welding electrodes 14, 16 to perform resistance spot welding on the workpiece stack-up assembly 32 is illustrated. To begin, as shown in FIG. 2, and with the weld faces 40, 42 being aligned and centered on the common axis 18, the central ascending convex surface 28 of first spot welding electrode 14 is contacting the first outer surface 36 of the workpiece stack-up assembly 32 proximate the aluminum workpiece 12 and the preferably flat annular surface 26 that surrounds the central descending concave surface 30 of the second spot welding electrode 16 is contacting the second outer surface 38 of the assembly 32 proximate the steel workpiece 10. The contact of the welding electrodes 14, 16 is "proximate" to its respective workpiece 10, 12 if it entails direct contact with the workpiece—meaning direct contact between the convex surface 28 and the outer surface 12' of the aluminum workpiece 12 or direct contact between the annular surface 26 and the outer surface 10' of the steel workpiece 10—or contact with another workpiece surface of the same base metal type that overlies the workpiece in question. The annular surface 24 that surrounds the central ascending convex surface 28 and the central descending concave surface 30 are not in contact with their respective surfaces 36, 38 of the workpiece stack-up assembly 32 at the time of initial contact. The two spot welding electrodes 14, 16 apply an initial opposing compression force of 400 lb to 2000 lb, or more narrowly 600 lb to 1300 lb, against the respective surfaces 36, 38 the workpiece stack-up assembly 32, just as electrical current of, typically, between 5 kA to 50 kA for a total duration of 40 ms to 2500 ms, or more narrowly 200 ms to 1000 ms, is passed between the weld faces 40, 42 of the spot welding electrodes 14, 16 and through the workpieces 10, 12.

The passing electrical current rapidly heats up the more electrically and thermally resistive steel workpiece 10 to a temperature above the melting point or range of the adjacent portion of the aluminum workpiece 12. Heat from the steel workpiece 10 is transferred into the adjacent portion of the aluminum workpiece 12 to create a molten weld pool within the aluminum workpiece 12 that wets the adjacent faying surface of the steel workpiece 10. Such wetting of the steel workpiece faying surface with molten aluminum tends to cause molten aluminum to react with or dissolve iron from the steel workpiece 10 while simultaneously growing a brittle intermetallic layer along the surface of the steel workpiece 10 that may include $FeAl_3$ compounds, $Fe_2Al_5$ compounds, and possibly other Fe—Al intermetallic compounds as well. Upon termination of the electrical current flow between the weld faces 40, 42 of the first and second spot welding electrodes 14, 16, the molten weld pool created within the aluminum workpiece 12 solidifies into a spot weld 50 that includes a weld joint 52 (FIG. 3). The weld joint 52 includes a nugget of resolidified aluminum workpiece material, which usually has a nominal diameter in the range of 6 mm to 8 mm, along with the intermetallic layer along a bonding interface 54 of the weld joint 52 and the steel workpiece 10. Because an excessively thick intermetallic layer is believed to adversely affect the strength of the spot weld in both peel and cross-tension, it is desired that the intermetallic layer not exceed 4 µm in thickness and, more preferably, that it be kept below 2 µm in thickness.

Referring back to FIG. 2 for the moment, it is seen that the combination of the central ascending convex surface 28 of first spot welding electrode 14 and the preferably flat annular surface 26 that surrounds the central descending concave surface 30 of the second spot welding electrode 16 cooperate to distribute the electrical current passing between the weld faces 40, 42 along a radially outwardly expanding flow path 56 that extends from the first spot welding electrode 14 to the second spot welding electrode 16. This results in very high current density within the aluminum workpiece 12 at an interface with the central ascending convex surface 28 of the weld face 40 of the first spot welding electrode 14 and a much lower current density within the steel workpiece 10 at an interface with the annular surface 26 of the weld face 42 of the second spot welding electrode 16, meaning that virtually no electrical current flows through the central regions of the molten weld pool while the flow path 56 is established.

The reduced current density within the steel workpieces 10 helps to decrease the thickness of the intermetallic layer across the whole bonding interface 54 of the weld joint 52, but is especially effective in doing so at the central region of the weld joint 52. Moreover, since heat concentration at the center of the molten weld pool is avoided, overheating and expulsion of liquid aluminum is less of a concern. The annular surface 24 surrounding the ascending convex surface 28 of the weld face 40 of the first spot welding electrode 14 may eventually make contact with the first outer surface 34 of the stack-up assembly 32 at high levels of sheet indentation. If such contact occurs, the radially outwardly expanding flow path 56 will begin to subside and may in fact cease to exist, particularly if the annular surface 24 of the weld face 40 of the first spot welding electrode 14 is flat to match the preferably flat annular surface of the weld face 42 of the second spot welding electrode 16, resulting in a more uniform cylindrical current flow path and the stoppage of further indentation of the weld face 40.

Referring now to FIG. 3, a programmed electrical current flow has been accomplished and terminated, and the weld joint spot weld 52 has been formed. As shown, the use of the first and second welding electrodes 14, 16 with their mating weld faces 40, 42 has formed the weld joint 52 within the aluminum workpiece 12, and has resulted in the bonding interface 54 of the weld joint 52 and the steel workpiece 10 being deformed toward the central descending concave surface 30 into a non-planar profile such as a curved or angled profile. Both the weld joint 52 and the adjacent weld-bonded portion 58 of the steel workpiece 10, which are joined along the bonding interface 54, have been deformed from the original planar profiles of the workpieces 10, 12 at the spot weld location into a spherically curved shape. Much of the thickness of the aluminum workpiece 12 has been maintained across the weld joint 52 while the more uniform, expanded temperature distribution within the molten weld pool as a consequence of the induced electrical current flow path 56 has minimized and re-distributed the formation of Fe—Al intermetallic compounds along the bonding interface 54 thereby minimizing the thickness of the intermetallic layer. In addition to helping inhibit the growth of a brittle intermetallic layer, is also believed that the shear produced by the pressure of the mating weld faces 40, 42 helps disrupt and relocate oxide film residue that may be originally present on the aluminum workpiece 12, thus minimizing the detrimental effect of the oxide film. Moreover, by forming the curved bonding interface 54, which is shown ideally in FIG. 3, the joint strength, as measured by peel strength and cross-tension strength, can be enhanced as cracks cannot easily propagate along the non-flat bonding interface 54.

Figure 4:
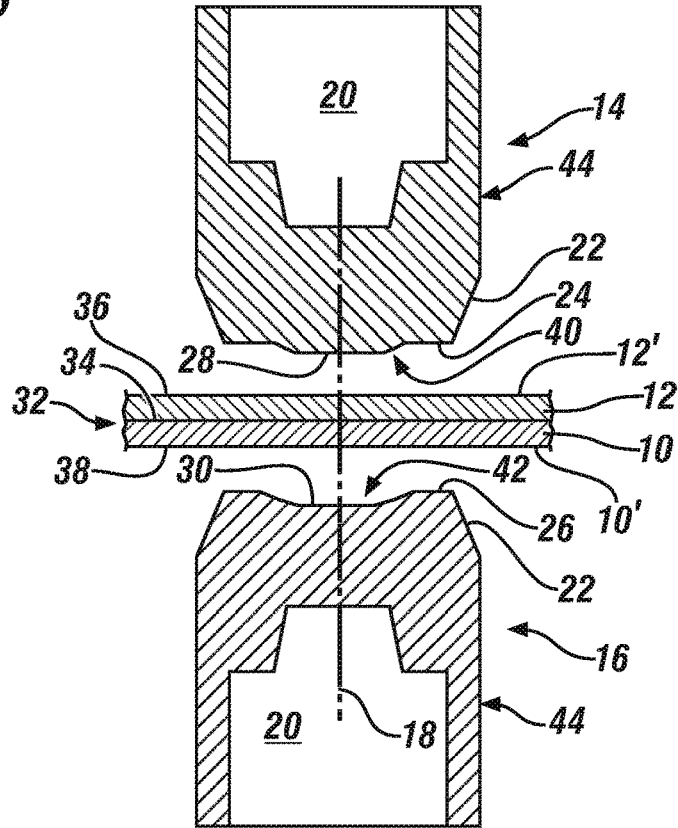
FIG. 4 is an enlarged schematic side view, in cross-section, of a workpiece stack-up assembly and opposed first and second spot welding electrodes similar to that shown in FIG. 1, although here the geometry of the central ascending convex surface and the central descending concave surface is different than that illustrated in FIG. 1.

In the description above, one particular embodiment of the central ascending convex surface 28 of the weld face 40 of the first spot welding electrode 14 the central descending concave surface 30 of the weld face 42 of the second spot welding electrode 16 as been described in which each of those surfaces 28, 30 may be spherical. The shape of the central ascending convex surface 28 and the central ascending concave surface 30, however, are not limited only to mating spherical geometries, as other mating geometries can function in accordance with the principles and teachings set forth above. For instance, the central ascending convex surface 28 may rise above its surrounding annular surface 24 while being formed as a sectional portion of an ellipsoid, a sectional portion of a truncated sphere (i.e., a partial sphere with a flat top surface), a truncated cone, or some other geometrical shape. Likewise, the central descending concave surface 30 may be formed as an intruding depression of a sectional portion of an ellipsoid, a sectional portion of a truncated sphere, a truncated cone, or some other geometrical shape as needed to mate with the central ascending convex surface 28. FIG. 4 shows specifically an embodiment in which the central ascending convex surface 28 is a sectional portion of a truncated cone and the central descending concave surface 30 is an intruding depression of a sectional portion of a truncated cone such that the two weld faces 40, 42 have a mating relationship. The terms "convex" and "concave" as used in this disclosure are thus not necessarily limited to spherical geometries or even geometries defined by continuous curved profiles.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method comprising:
providing a workpiece stack-up assembly that comprises a steel workpiece and adjacent aluminum workpiece that overlaps with the steel workpiece to establish a faying interface therebetween, the workpiece stack-up assembly having a first outer surface proximate the aluminum workpiece and an opposed second outer surface proximate the steel workpiece;
pressing a first spot welding electrode against the first outer surface of the workpiece stack-up assembly, the first spot welding electrode comprising a weld face that includes a central ascending convex surface that rises above an annular surface that surrounds the central ascending convex surface, wherein, at least initially, the central ascending convex surface makes contact with the first outer surface of the workpiece stack-up assembly and the surrounding annular surface of the weld face of the first welding electrode does not;

pressing a second spot welding electrode against the second outer surface of the workpiece stack-up assembly, the second spot welding electrode comprising a weld face that includes a central descending concave surface that drops below an annular surface that surrounds the descending concave surface, wherein, at least initially, the annular surface of the weld face of the second welding electrode makes contact with the second outer surface of the workpiece stack-up assembly and the descending concave surface does not;

passing an electrical current between the weld faces of the first and second spot welding electrodes across the faying interface of the steel and aluminum workpieces to cause melting of the aluminum workpiece and the formation of a molten weld pool within the aluminum workpiece that wets an adjacent surface of the steel workpiece, the electrical current being distributed along a radially outwardly expanding flow path that extends from the ascending convex surface of the weld face of the first spot welding electrode to the annular surface of the weld face of the second spot welding electrode such that a density of the electrical current is higher in the aluminum workpiece at an interface with the central ascending convex surface of the weld face of the first spot welding electrode than in the steel workpiece at an interface with the annular surface of the weld face of the second spot welding electrode; and, thereafter, terminating passage of the electrical current between the weld faces of the first and second spot welding electrodes so that the molten weld pool solidifies into a weld joint that bonds the steel and aluminum workpieces together, and wherein the weld joint includes a bonding interface with the adjacent surface of the steel workpiece that is deformed toward the central descending concave surface of the weld face of the second spot welding electrode.

2. The method set forth in claim 1, wherein an outer workpiece surface of the aluminum workpiece provides the first outer surface of the workpiece stack-up assembly and an outer workpiece surface of the steel workpiece provides the second outer surface of the workpiece stack-up assembly, and wherein the first spot welding electrode is pressed against the outer workpiece surface of the aluminum workpiece and the second spot welding electrode is pressed against the outer workpiece surface of the steel workpiece.

3. The method set forth in claim 1, wherein the aluminum workpiece comprises an aluminum alloy substrate having a surface oxide layer thereon.

4. The method set forth in claim 1, wherein the central ascending convex surface of the weld face of the first welding electrode is a sectional portion of a sphere having a radius of curvature between 50 mm and 5 mm.

5. The method set forth in claim 1, wherein the central descending concave surface of the weld face of the second welding electrode is an intruding depression of a sectional portion of a sphere having a radius of curvature between 50 mm and 5 mm.

6. The method set forth in claim 1, wherein a constant gap equal to an overall thickness of the workpiece stack-up assembly is maintained between the central ascending convex surface and the central descending concave surface during passage of the electrical current between the first and second spot welding electrodes.

7. The method set forth in claim 1, wherein the annular surface of the weld face of the first welding electrode comes into contact with the first outer surface of the workpiece stack-up assembly during passage of the electrical current between the weld faces of the first and second spot welding electrodes, thereby causing the radially outwardly expanding flow path of the electrical current to cease to exist.

8. A method comprising:

pressing a central ascending convex surface of a weld face of a first spot welding electrode against a first outer surface of a workpiece stack-up assembly that includes a steel workpiece and an adjacent aluminum workpiece that overlaps with the steel workpiece, the first outer surface of the workpiece stack-up assembly being proximate the aluminum workpiece;

pressing an annular surface of a weld face of a second spot welding electrode against a second outer surface of the workpiece stack-up assembly that is opposed to the first outer surface, the annular surface of the weld face of the second spot welding electrode surrounding a central descending concave surface that extends below the annular surface of the weld face of the second spot welding electrode and is complimentary in shape to the central ascending convex surface of the weld face of the first spot welding electrode, the second outer surface of the workpiece stack-up assembly being proximate the steel workpiece, and wherein the weld face of the first spot welding electrode and the weld face of the second spot welding electrode are aligned with and centered on a common axis;

forming a resistance spot weld that bonds together the steel and aluminum workpieces, wherein forming the resistance spot weld comprises passing an electrical current between the central ascending convex surface of the weld face of the first spot welding electrode and the annular surface of the weld face of the second spot welding electrode so that the electrical current passed between the weld face of the first spot welding electrode and the weld face of the second spot welding electrode is distributed along a radially outwardly expanding flow path that extends from the first spot welding electrode to the second spot welding electrode such that a density of the electrical current is higher in the aluminum workpiece at an interface with the central ascending convex surface of the weld face of the first spot welding electrode than in the steel workpiece at an interface with the annular surface of the weld face of the second spot welding electrode.

9. The method set forth in claim 8, wherein the spot weld is comprised of a weld joint contained entirely within the aluminum workpiece that includes a bonding interface with an adjacent surface of the steel workpiece that is deformed toward the second spot welding electrode.

10. The method set forth in claim 8, wherein the weld face of the first spot welding electrode further includes an annular surface that surrounds the central ascending convex surface.

11. The method set forth in claim 10, wherein the central ascending convex surface of the weld face of the first welding electrode is a sectional portion of a sphere having a radius of curvature between 50 mm and 5 mm.

12. The method set forth in claim 8, wherein the central descending concave surface of the weld face of the second welding electrode is an intruding depression of a sectional portion of a sphere having a radius of curvature between 50 mm and 5 mm.

13. The method set forth in claim 8, wherein an outer workpiece surface of the aluminum workpiece provides the first outer surface of the workpiece stack-up assembly and an outer workpiece surface of the steel workpiece provides the second outer surface of the workpiece stack-up assembly, and wherein the first spot welding electrode is pressed against the outer workpiece surface of the aluminum workpiece and the second spot welding electrode is pressed against the outer workpiece surface of the steel workpiece.

14. The method set forth in claim 8, wherein the weld face of the first spot welding electrode comprises a annular surface that surrounds the central ascending convex surface such that the central ascending convex surface rises above the annular surface of the weld face of the first spot welding electrode, and wherein the annular surface of the weld face of the second spot welding electrode is flat and oriented perpendicular to a common axis upon which the weld face of the first spot welding electrode and the weld face of the second spot welding electrode are aligned.

15. The method set forth in claim 14, wherein the annular surface of the weld face of the first welding electrode comes into contact with the first outer surface during passage of the electrical current between the weld faces of the first and second spot welding electrodes, thereby causing the radially outwardly expanding flow path of the electrical current to cease to exist.

16. The method set forth in claim 8, wherein a constant gap equal to an overall thickness of the workpiece stack-up assembly is maintained between the central ascending convex surface and the central descending concave surface during passage of the electrical current between the first and second spot welding electrodes.

17. A method comprising:
providing a workpiece stack-up assembly that comprises a steel workpiece an adjacent aluminum workpiece that overlaps with the steel workpiece to establish a faying interface therebetween, the workpiece stack-up assembly having a first outer surface proximate the aluminum workpiece and an opposed second outer surface proximate the steel workpiece;
pressing a first spot welding electrode against the first outer surface of the workpiece stack-up assembly, the first spot welding electrode comprising a weld face that includes a central ascending convex surface that rises above an annular surface that surrounds the central ascending convex surface, wherein, at least initially, the central ascending convex surface makes contact with the first outer surface of the workpiece stack-up assembly and the surrounding annular surface of the weld face of the first welding electrode does not;
pressing a second spot welding electrode against the second outer surface of the workpiece stack-up assembly, the second spot welding electrode comprising a weld face that includes a central descending concave surface that drops below an annular surface that surrounds the descending concave surface, the central descending concave surface of the weld face of the second spot welding electrode being complimentary in shape to the central ascending convex surface of the weld face of the first spot welding electrode, and wherein, at least initially, the annular surface of the weld face of the second welding electrode makes contact with the second outer surface of the workpiece stack-up assembly and the descending concave surface does not;
passing an electrical current between the weld faces of the first and second spot welding electrodes across the faying interface of the steel and aluminum workpieces to form a molten weld pool within the aluminum workpiece that wets an adjacent surface of the steel workpiece, the electrical current initially being distributed along a radially outwardly expanding flow path that extends from the first spot welding electrode to the second spot welding electrode such that a density of the electrical current is higher in the aluminum workpiece at an interface with the central ascending convex surface of the weld face of the first spot welding electrode than in the steel workpiece at an interface with the annular surface of the weld face of the second spot welding electrode, the annular surface of the weld face of the first spot welding electrode eventually coming into contact with the first outer surface of the workpiece stack-up assembly during passage of the electrical current between the weld faces of the first and second spot welding electrodes to thereby cause the radially outwardly expanding flow path of the electrical current to cease to exist; and
terminating passage of the electrical current between the weld faces of the first and second spot welding electrodes so that the molten weld pool solidifies into a weld joint that bonds the steel and aluminum workpieces together, and wherein the weld joint includes a bonding interface with the adjacent surface of the steel workpiece that is deformed toward the central descending concave surface of the weld face of the second spot welding electrode.

18. The method set forth in claim 17, wherein the central ascending convex surface of the weld face of the first welding electrode is a sectional portion of a sphere having a radius of curvature between 50 mm and 5 mm, and wherein the central descending concave surface of the weld face of the second welding electrode is an intruding depression of a sectional portion of a sphere having a radius of curvature between 50 mm and 5 mm.

\* \* \* \* \*